June 1, 1971   E. W. BUCHER   3,582,436
CARPET SEAMING TOOL AND TAPE AND PROCEDURE FOR USING THE SAME
Filed April 25, 1969   2 Sheets-Sheet 1
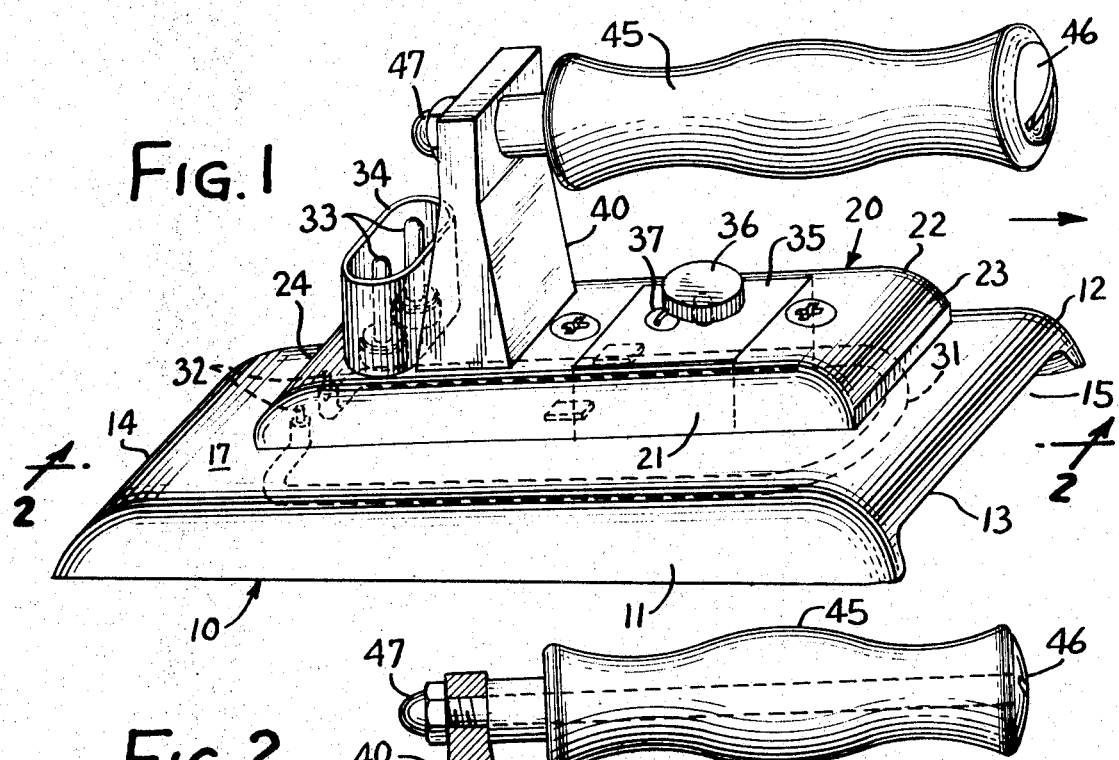
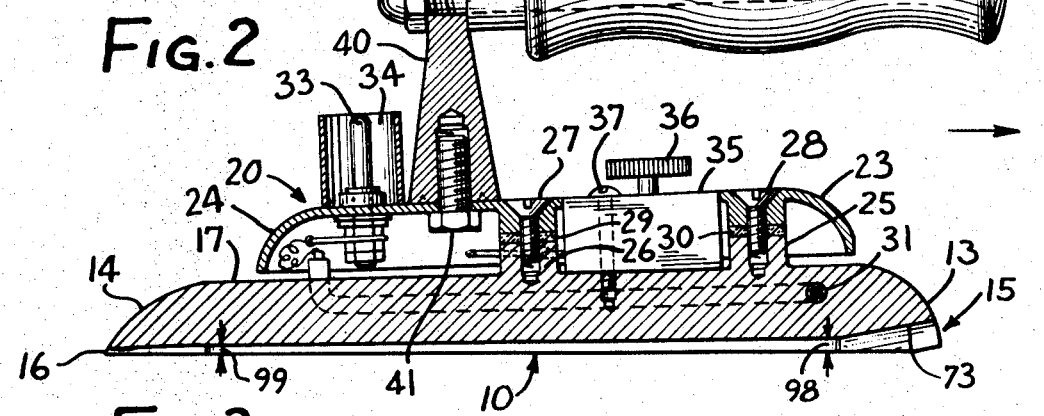
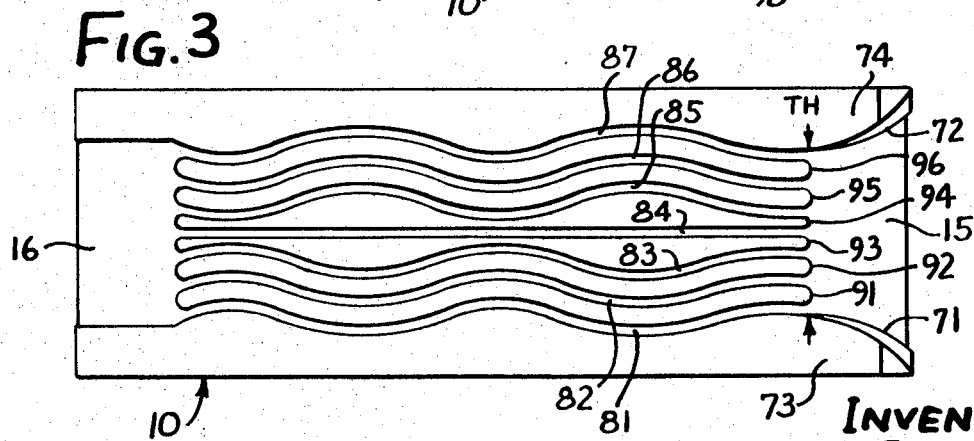
INVENTOR
EMIL W. BUCHER
by: Wolfe, Hubbard, Voit & Osann
ATTYS.

June 1, 1971        E. W. BUCHER        3,582,436
CARPET SEAMING TOOL AND TAPE AND PROCEDURE FOR USING THE SAME
Filed April 25, 1969        2 Sheets-Sheet 2
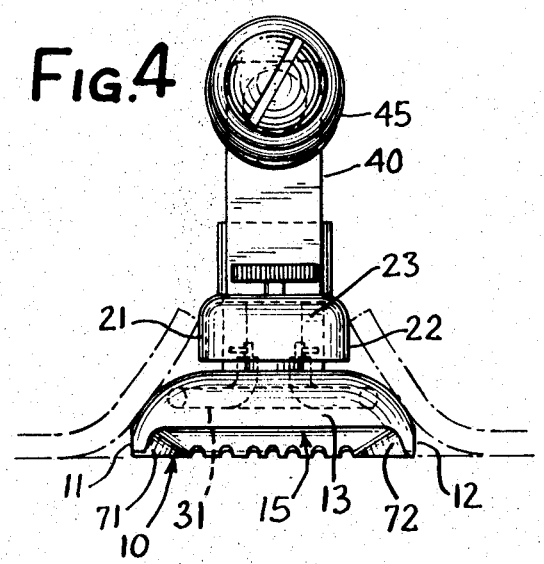
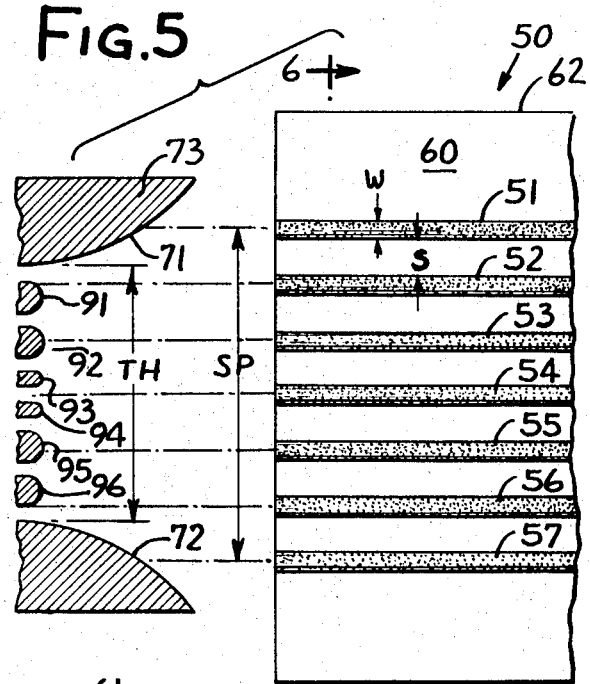
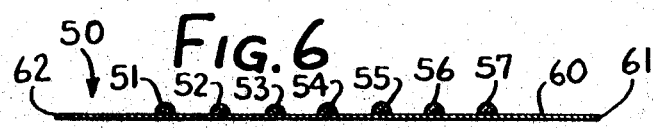
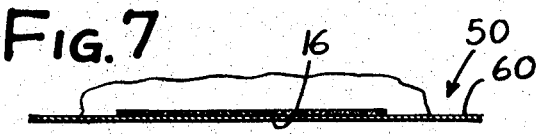
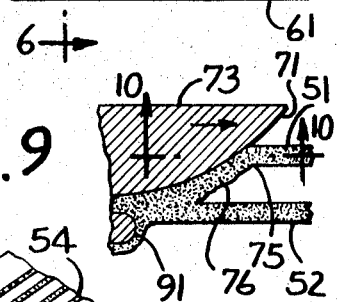
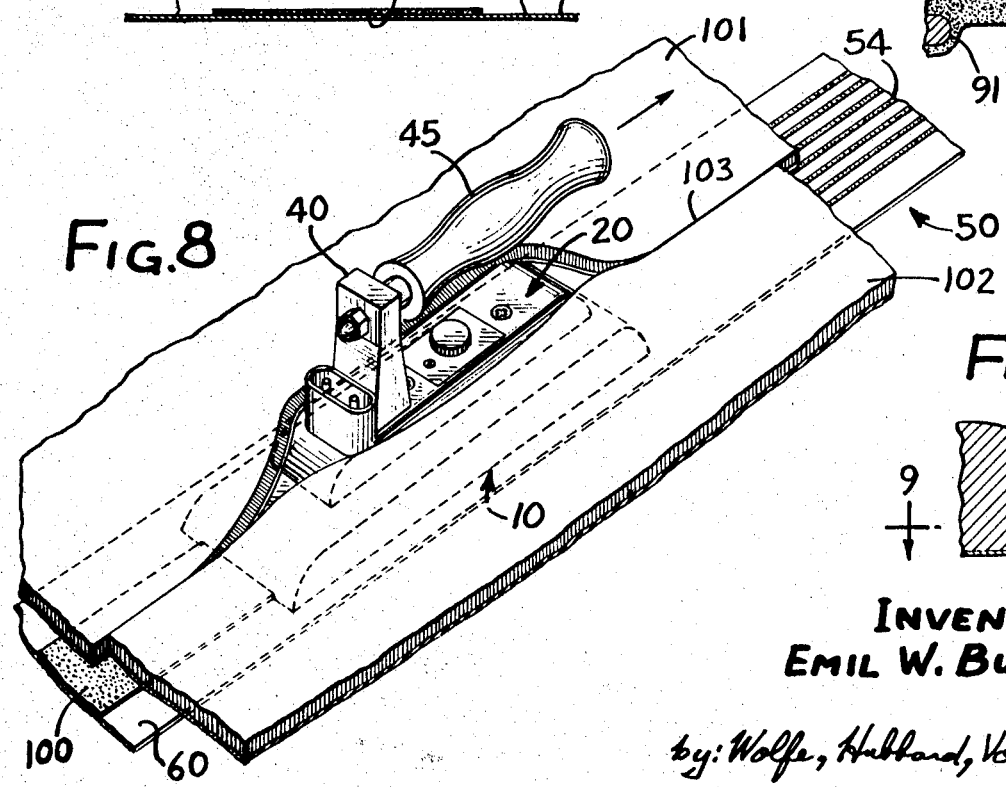
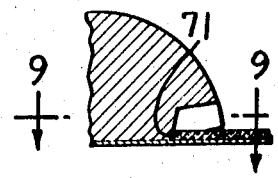
INVENTOR
EMIL W. BUCHER
by: Wolfe, Hubbard, Voit & Osann
ATTYS.

3,582,436
CARPET SEAMING TOOL AND TAPE AND PROCEDURE FOR USING THE SAME

Emil W. Bucher, Northbrook, Ill., assignor to Sure Seam Tape, Inc., Chicago, Ill.
Filed Apr. 25, 1969, Ser. No. 819,278
Int. Cl. B65h 69/02
U.S. Cl. 156—502                                   17 Claims

ABSTRACT OF THE DISCLOSURE

A carpet seaming tool in the form of a sadiron having a specially grooved bottom surface used with a densely woven tape having a ribbon of hot-melt adhesive thereon in the form of spaced longitudinal beads to provide a continuous extruded ribbon of molten adhesive for joining abutted edges of carpeting.

---

Traditionally adjacent sections of carpeting have been joined by sewing together. Because of the saving in time and effort, carpet installers now prefer to make a permanent joint between abutted edges of carpeting by means of cloth tape coated with adhesive, referred to as hot-melt adhesive, capable of being converted to the molten state by an electrically heated sadiron. Two procedures are in common usage. The first, referred to as backseaming, involves inverting the carpet and applying inverted tape to the joint with application of heat and pressure on the backside of the tape. The second and more popular procedure, known as face seaming, involves working from the face of the carpet with the edges thereof centered over a faced up strip of tape having a ribbon of hot-melt adhesive and with the sadiron being inserted between the upturned edges to melt the adhesive, following which the edges are immediately pressed into place to form a permanent bond.

It has been customary in face seaming to employ a tape, several inches in width, in the form of open work or "scrim" backed by an integral strip of paper to protect the floor. While this constituted a worthwhile step in the carpet joining art, use of conventional tapes and irons is accompanied by a number of disadvantages. It is found that the bond which is achieved depends a good deal upon the skill of the operator. Thus if the sadiron is advanced too slowly, particularly where a high degree of downward pressure is applied, the hot-melt adhesive tends to be squeezed through the open work outwardly away from the joint so that only a small amount of adhesive is left to form the bond. Conversely where the sadiron is advanced too rapidly, or is set at too low a temperature, the adhesive is inadequately melted so that it is cooled below a reliable bonding temperature before the edges of the carpet can be pressed into place. In short, the tools and tapes which have been available heretofore have not permitted the advantages which are inherent in this type of sealing to be fully utilized, especially where reliance must be placed upon relatively unskilled personnel.

It is, accordingly, an object of the present invention to provide a novel carpet seaming system in which a specially formed tool is provided for operating upon especially constructed tape to provide a bond of high reliability at each point along the joint in spite of the wide variation of conditions which may exist in the field and wthout requiring any particular skill or attention on the part of the operator. More specifically, it is an object to provide a seaming tool and tape which cooperate in such a manner as to produce upon the tape a ribbon of molten adhesive which is of reliable and uniform thickness concentrated in the region of the joint and which indeed is at all times precisely centered with respect to the joint notwithstanding inaccuracies in the positioning of the cold tape as it is laid upon the floor. In this connection it is an object to provide a carpet seaming tool and tape for use therewith which produces a uniform and centered ribbon of molten adhesive regardless of the amount of downward pressure which may be applied to the tool.

It is one of the important objects of the present invention to provide a tool having a groove, or grooves, formed longitudinally on the underside defining lands which obstructiongly engage upstanding beads of adhesive on the tape thereby to limit the progressive advancement of the tool to a rate which depends upon the rate of melting of the encountered adhesive. In this way, for a given tool temperature, the forward advancement of the tool is limited by the change of state of the adhesive and is relatively constant over a wide range of forwardly applied force; consequently the rate of movement is no longer a matter of the judgment of the operator. Thus, even when the tool is used by unskilled personnel, molten adhesive is discharged at just the right temperature and with just the right placement for maximum bonding effect. Variations in temperature setting are largely self compensating.

It is yet another object of the invention to provide a novel carpet seaming tape which maintains a good bond with the adhesive but which avoids the disadvantages associated with the use of scrim or open work. More specifically it is an object to provide a tape having upstanding beads or ridges of adhesive and which minimizes the problem of bleed-through encountered with conventional tapes with the result that the bulk of the adhesive is maintained on the surface of the tape evenly distributed, in molten form, along the length of the tape in an optimum quantity for making a joint of highest reliability.

It is another object to provide a carpet seaming tool and tape especially well suited for use in face seaming but which may be employed with equal advantage when using the back seaming technique.

It is still another object of the present invention to provide a tool for capet seaming which is easy and convenient to use, which guides the edges of the carpet appropriately at the leading and trailing edges of the tool and which does not exceed a comfortable temperature in the hand of the operator even after extended periods of operation.

Other objects and advantages of the invention will become apparent upon reading the attached detailed description and upon reference to the drawings in which:

FIG. 1 is a perspective view of a carpet seaming tool constructed in accordance with the present invention;

FIG. 2 is a vertical section through the tool looking along the line 2—2 in FIG. 1;

FIG. 3 is a bottom view showing the profiles of the grooves in the sole plate;

FIG. 4 is a front view of the tool of FIG. 1;

FIG. 5 shows the profile of the lands on the sole plate related to the beads on the tape;

FIG. 6 is a cross sectional view of the tape taken along the line 6—6 in FIG. 5;

FIG. 7 is a view in elevation of the extrusion opening showing the deposit of molten adhesive;

FIG. 8 is a perspective view of the tool in operation;

FIG. 9 is a fragmentary section looking along the line 9—9 in FIG. 10 and showing the melting of the adhesive upon engagement with the land surfaces; and FIG. 10 is a fragmentary section looking along the line 10—10 in FIG. 9.

While the invention has been described in connection with a preferred embodiment, it will be understood that I do not intend to be limited to the embodiment shown but intend, on the contrary, to cover the various alternative and equivalent constructions and procedures as may be included within the spirit and scope of the invention.

Turning now to FIGS. 1 and 2 of the drawings there is disclosed a seaming tool having a sole plate 10 of generally rectangular configuration having sides 11, 12, a leading end 13 and a trailing end 14. The leading end has an entry way 15 while the trailing end has an extrusion opening 16 which will be referred to in greater detail as the discussion proceeds. The exposed edges are all smoothly rounded, merging with a flat top surface 17.

Superimposed upon the sole plate is a hollow cap member 20 which is of generally rectangular shape, more or less centered on the sole plate but shorter and narrower than the sole plate to form a central island. The cap member has straight side walls 21, 22, a rounded leading edge 23 and a rounded trailing edge 24. For the purpose of supporting the cap member in a thermally insulated position spaced above the sole plate, the sole plate is provided with integral pillars 25, 26 which are threaded for reception of machine screws 27, 28. To inhibit direct conduction of heat from the pillars insulating washers 29, 30 are interposed as shown. The free flow of air within and around the cap member insures that it will remain at a temperature which is substantially below that of the sole plate.

For heating the sole plate, an electric heating element, commonly referred to as a calrod element, indicated at 31 is provided having terminals 32. For conducting current to the heating element prongs 33 extend upwardly within a protective socket 34 for reception of the usual appliance plug (not shown). In order to control the temperature at which the sole plate is maintained by the heating element, a thermostat 35 is used which has a control knob 36 and which may be conveniently packaged for clamping against the sole plate by a mounting screw 37. As is conventional, the thermostat is connected in series with the element for on-off cycling at a temperature determined by the setting of the knob.

In order to propel the tool during the seaming operation, a vertically extending bracket 40 is provided adjacent the trailing end of the cap, secured in place by a machine screw 41. Extending horizontally from the bracket and overlying the cap and sole plate is a handle 45 of wood or plastic material secured in place by a centrally extending screw 46 held captive by a nut 47.

In accordance with the present invention a shallow longitudinal groove is formed on the underside of the seaming tool extending from the entryway 15 to the extruding opening 14 with the extrusion opening having a cross sectional area which is substantially smaller than that of the entryway so that the body of adhesive entering the tool, and which is melted and confined within the groove, is converged toward the extrusion opening, substantially filling it thereby to deposit a layer of molten adhesive which is of constant thickness as the tool is drawn forwardly by the handle. As a related portion of the invention a seaming tape is provided having a cloth body of relatively densely woven material with a ribbon of adhesive deposited thereon in the form of spaced upstanding beads, the span and arrangement of the beads being related to land surfaces within the tool so that the beads perform an obstructing function, permitting the tool to advance only in accordance with the rate of melting.

Thus referring to the tape as shown in FIGS. 5, 6 and 7, and which is indicated at 50, it will be noted that it has, in the present instance, a series of seven beads indicated at 51–57 which are spaced parallel to one another along the central portion of the tape. The body of the tape, indicated at 60, is formed of densely woven fabric, for example, cotton duck, although it will be apparent that other materials capable of forming a bond with the adhesive, such as rayon or glass fiber, may be used. The lateral edges of the tape, indicated at 61, 62, as shown in FIG. 5, extend beyond the width of the tool while the "span" of the adhesive beads, indicated at SP, is less than the width of the tool.

Turning attention next to the groove profile on the underside of the sole plate shown in FIG. 3, it will be noted that the entryway, indicated at 15, has sidewalls 71, 72 which are nearly perpendicular to the bottom surface of the sole plate and which define land surfaces 73, 74 extending along the lateral edges of the tool. The sidewalls converge to a throat indicated at TH which is of less width than the span SP of the adhesive on the tape with the result that the outermost ones of the beads engage the sidewalls of the entryway to obstruct forward movement. Thus as shown in FIG. 9, the bead of adhesive 51, in striking the vertical surface 71 associated with the land 73 is melted at 75 with the molten adhesive being thereafter urged inwardly toward the throat along the path 76.

In accordance with one of the features of the present invention the longitudinally extending groove which joins the entryway and extrusion opening, is formed in a series of narrower grooves, or groove sections, which are spaced parallel to one another to provide tape-engaging land surfaces between them and are of sinuous or "lazy S" shape so that the molten adhesive material is laterally worked, or agitated, as it flows relatively under the tool. Thus referring to FIG. 3 individual grooves 81–87 are provided defining between them lands 91–96. The individual grooves 81–87 are preferably arranged at a closer spacing than the corresponding beads of adhesive 51–57 so that at least a portion of the beads are obstructed by the leading ends of the lands. The intentional misalinement is shown in FIG. 5. The resulting obstructive effect augments the obstruction which takes place at the sidewalls 71, 72 of the entryway. Note, for example, the obstruction provided by the land 91 against the bead 52. The net result, because of the many points of obstruction, is that the tool can be moved along the tape by the operator only as fast as the melting of the beads by the sole plate may occur. This is provided, of course, that sufficient downward pressure is applied against the handle so as to keep the lands of the sole plate in contact with the fabric or body of the tape. As the obstruction is overcome by melting of the beads of adhesive, the tool proceeds forwardly at a rate which is substantially independent of the horizontal force which is being applied to the tool. Thus the tool may be put into the hands of an untrained operator with the simple instruction to hold the tool in contact with the tape and simply push it as fast as it will go. No judgment or experience on the operator's part is required. The fact that melting of the adhesive must occur as the adhesive enters the tool insures that the adhesive which subsequently leaves the tool is at an appropriately high temperature to insure a positive bond. Moreover the temperature of the tool is noncritical, as long as it is substantially above the melting point of the adhesive, since the higher the temperature the higher the rate of melting and hence the more rapidly the tool may be moved. Compensation occurs by reason of the fact that the more rapidly moving tool is in contact with the adhesive for a shorter period of time so that the temperature of the deposited molten adhesive ends to be within a relatively narrow range.

In accordance with one of the features of the present invention, the cross-sectional area of the extrusion opening is not only substantially less than the cross sectional area at the entryway but the area extrusion opening is tailored so as to be substantially equal to the aggregate cross sectional area of the adhesive beads, with the result that the extrusion opening is kept substantially filled with adhesive at all times as the tool is advanced along the tape. This area relationship is brought out by comparing FIGS. 6 and 7 which show the cross section of the beads 51–57 related to the cross sectional area of the extrusion opening 16. As a result, the molten adhesive indicated at 100 (see also FIG. 8) has not only a predetermined width, defined by the extrusion opening, for example 1⅞ inch, but also a predetermined thickness, preferably 1/32 inch. Such width and thickness, are not in any way affected by the amount of downward pressure which may be applied to the tool since the pressure is absorbed by the land surfaces on the underside of the tool. Hence any added pressure simply has the effect of more completely confining the adhesive so that it does not uselessly escape. This positioning and confinement of the adhesive in a patth alined with the tool is to be contrasted with conventional techniques in which additional pressure results in the squeezing of the molten adhesive either into the fabric structure of the tape or sideways out from under the tool, the effectiveness of the adhesive in both cases being lost.

For the purpose of converging the adhesive from the time that it enters the entryway 15 to the time that it is discharged at the extrusion opening the cross sectional area of the groove, or grooves, is preferably decreased progressively along the length of the tool. Thus as shown in FIG. 2, the height of a typical groove is greater at the beginning 98 than at the end 99 adjacent the extrusion opening.

It is one of the features of the path taken by the adhesive through the tool that the beads of adhesive are subjected to pre-heat from the tool prior to the time of actual melting engagement because of the overhang at the entryway, which speeds up progress of the tool, especially when the floor is cold.

Having understood the manner in which the tape and tool cooperate with one another, more specific reference may be made to the construction of the tape. Closely woven cotton duck is preferred having a weight of 7 to 10 ounces per square yard and the tape is preferably cut to a width of, say, 3 to 4 inches, somewhat greater than the width of the tool. During the course of manufacture the fabric is coated with a binder coating of thermoplastic material prior ot being slit. This not only prevents raveling at the edges, but the conditions of application are such that the binder penetrates the upper surface of the tape providing a base for adhesion of the adhesive beads 51–57. The hot melt adhesive, known per se in the art as "HMA," corresponds to that set forth in U.S. Pat. 3,400,038 which issued Sept. 3, 1968, having a viscosity on the order of 10,000 to 15,000 centipoise at a temperature of 350–375° F. The beads are applied to the tape at a temperature which exceeds the melting point by a relatively limited amount so that the beads "stand proud" above the tape to a height which may, in a practical case, be within the range of 1/32 to 3/32 inch. The area on the tape occupied by the adhesive beads is preferably about ½ to ⅓ of the total span. Thus in a practical case each bead may have a width on the order of ⅛ inch and with the individual beads separated by a clear space having a width of approximately ¼ inch. While it is one of the features of the invention that beaded tape is employed, it will be understood by those skilled in the art that the invention, in certain of its aspects, is not limited to use with beaded tape and the adhesive may possibly be in the form of a ribbon of constant thickness, provided that the ribbon is sufficiently thick and well defined so as to provide the obstructive effect described above.

Similarly, while it is preferred to employ a plurality of grooves beacuse of the lateral working or agitation of the adhesive, it will be understood that a certain amount of energy is required to overcome the resistance to working and hence the number of grooves may, if desired, be reduced below the number shown and indeed, as an extreme case, may be reduced to one.

In using the tool and tape described above for the process of "face seaming" the adjacent sections of carpeting, indicated at 101, 102 in FIG. 8, are laid edge to edge in the desired position on the floor. The abutting edges are then turned back slightly to permit the tape 50 to be laid on the floor in a position centered with respect to the joint 103. To facilitate centering, the central bead of adhesive, indicated at 54, is preferably pigmented so as to be of a distinctive color. With the carpeting in place in the "unstretched" condition, the tool, having been brought up to operating temperature, which may be on the order of 350° at the sole plate, is then inserted between the edges of the carpeting in the position shown in FIG. 8 and moved ahead, while applying downward pressure, as rapidly as may be permitted by the melting of the adhesive. Provided that the tool is guided along more or less centered with the joint 103, the ribbon of molten adhesive, indicated at 100, will be deposited in a centered position with respect to the joint, i.e., in a position which provides the same width of adhesive to both of the pieces of carpet. In this connection it may be noted that even if the tape has been carelessly laid with respect to the joint 103 or even if it should tend to creep to one side or the other with respect to the joint, the tool, centered with the joint, will tend to crowd the adhesive over in one direction or the other so that the molten ribbon of adhesive is in fact joint-centered. As the tool moves along, the edges of the sections of carpet will tend to flow down the rounded trailing edge 14 of the tool into seated position against the tape. Since the tool is operated with one hand, the other of the operator's hands may be employed to press the edges of the carpet into intimate contact with the molten adhesive, drawing the edges together if the situation requires it. In any event, since the tool is advanced at a rate which is controlled by melting and since the molten adhesive is deposited at a constant rate, in a constant cross section and at a substantially constant temperature, there is little variation in the bonding effect thereby producing a high degree of consistency and strength in the joint. It is found that bonded joints resulting from the use of the present tool and tape are capable of withstanding substantial stress as the carpet is finally stretched into position. Moreover since the type of adhesive used is waterproof and substantially age proof, the integrity of the bond may be assumed to last the life of the carpeting.

Usage of the tool for "face" seaming has been described in the above paragraphs but it will be understood that the tool and tape are both capable of effective use for back seaming in which the carpet and tape are inverted. In back seaming the heat is applied from the back or dry side of the tape. Where the heavier grades of fabric are employed, the interposition of the fabric between the tool and the beads will, of course, reduce the obstructing effect of the beads and it will be somewhat more difficult for the operator to sense the obstruction. It is found however using a relatively dense duck fabric, that the speed of the tool may be visually judged by noting the point of incipient bleed-through. That is, the operator may note, as the tool is moved along the tape, whether the appearance of the tape at the trailing end of the tool has changed slightly indicating that the adhesive is just beginning to penetrate through the thickness of the fabric. The tool is moved as rapidly as possible consistent with a slight change in appearance. It will be seen that the tool and tape described above therefore meet all of the requirements for convenient face or back seaming of carpeting and, indeed, the present tool may be employed to good effect in the joining of other heavy yet flexible floor coverings or materials in other fields such as canvas or the like.

The term "groove" as used herein shall be considered broad enough to cover a unitary groove or one made up of a composite of a number of narrow grooves in parallel with one another.

The term "generally rectangular," as used herein to refer to the sole plate configuration, has to do with the fact that the tool is longer than it is wide, and the term applies to but is not limited to a tool which has square corners. The term "handle" refers to any means for holding and propelling the tool.

I claim as my invention:

1. A carpet seaming assembly for seaming together the adjacent edges of sections of carpeting comprising, in combination, a cloth tape having an upstanding ribbon of hot-melt adhesive deposited thereon which is of constant cross section from point to point along the length of the tape, a sole plate having shallow longitudinal grooves having a convergent entryway at the leading end and an extrusion opening at the trailing end, a handle overlying the sole plate, the entryway having a maximum width which is greater than the width of the adhesive on the tape so that the convergent surfaces and the lands between the grooves are obstructingly engaged by the ribbon of adhesive as the sole plate is advanced along the tape by the handle thereby to limit the forward progress of the sole plate to the rate of melting of adhesive and thereby to insure that all of the adhesive on the tape is converted to molten form prior to flow of adhesive through the grooves for discharge of molten adhesive at a reliably high temperature from the extrusion opening, the extrusion opening having a cross sectional area which is approximately equal to the cross sectional area of the hot-melt adhesive supplied on the tape so that the extrusion opening remains substantially filled with molten adhesive as the sole plate is advanced for depositing of a layer of molten adhesive of uniform thickness centered with respect to the adjacent edges of the sections of carpeting.

2. A carpet seaming assembly for seaming carpeting comprising, in combination, a fabric tape having a ribbon of adhesive longitudinally deposited thereon consisting of a plurality of upstanding beads of adhesive spaced from one another in parallel relation, a generally rectangular sole plate, means for heating the sole plate to a temperature substantially above the melting temperature of the adhesive, an upstanding handle on the sole plate for guiding the same along the tape, said sole plate having an entryway at the leading end and having a plurality of longitudinally extending grooves leading to an extrusion opening at the trailing end, said entryway being flanked by convergent side walls defining adjacent land surfaces and said longitudinal grooves defining longitudinally extending land surfaces, the entryway being wider than the span of the beads of adhesive on the tape and the grooves being spaced so that at least a portion of the beads and lands are in obstruction until melting of the beads takes place thereby to limit the forward movement of the tool to a speed which is determined by the rate of melting of the beads to insure that all of the adhesive is converted to the molten state during the initial portion of its passage through the tool for extrusion of adhesive in the form of a molten layer of constant thickness along the center portion of the tape as the tool is manually advanced by the handle.

3. A carpet seaming tool for use with a cloth tape having a longitudinal deposit of hot-melt adhesive comprising, in combination, a generally rectangular sole plate, means for heating the sole plate, a handle overlying the sole plate for guiding the tool along the tape, said sole plate having a shallow groove formed in the bottom thereof bounded by land surfaces along the lateral edges, the groove having an entryway at the landing end and an extrusion opening at the trailing end, the extrusion opening having a cross sectional area which is substantially smaller than that of the entryway so that the body of adhesive melted by the sole plate and confined in the groove is converged toward the extrusion opening substantially filling the same for deposit of a molten layer of constant thickness along the central portion of the tape as the tool is pressed against the tape and drawn forwardly by the handle.

4. A carpet seaming tool for use with a cloth tape having a longitudinal ribbonlike deposit of hot-melt adhesive thereon comprising, in combination, a generally rectangular sole plate, means for heating the sole plate, a handle overlying the sole plate for guiding the tool along the tape, said sole plate having a shallow groove formed in the bottom thereof bounded by land surfaces along the lateral edges, the groove having an entryway at the leading end and an extrusion opening at the trailing end, the entryway having convergent sidewalls engaging the tape generally perpendicularly so as to come into obstructed engagement with the edge portions of the adhesive on the tape accompanied by continuous melting of the adhesive at the regions of engagement, the groove being of progressively reduced cross sectional area so that the body of molten adhesive confined within the groove is converged toward the extrusion opening substantially filling the same for deposit of a molten layer of substantially constant thickness along the central portion of the tape as the tool is pressed against the tape and drawn forwardly by the handle.

5. A carpet seaming tool for use with a cloth tape having a longitudinal deposit of hot-melt adhesive thereon comprising, in combination, a generally rectangular sole plate, means for heating the sole plate, a handle overlying the sole plate for guiding the tool along the tape, said sole plate having a shallow groove running the length of the bottom surface defining land surfaces along the lateral edges, said groove having an entryway at the leading end and an extrusion opening at the trailing end, the extrusion opening being smaller in both height and width than the mouth of the entryway.

6. The combination as claimed in claim 5 in which the entryway is convergent in both horizontal and vertical planes.

7. A carpet seaming tool for use with a cloth tape having a longitudinal deposit of hot-melt adhesive thereon comprising, in combination, a generally rectangular sole plate, means for heating the sole plate, a handle overlying the sole plate for guiding the tool along the tape, said sole plate having a plurality of parallel grooves formed in the bottom thereof and defining land surfaces along the lateral edges of the tool as well as land surfaces between the grooves, said land surfaces lying substantially in a common plane.

8. The combination as claimed in claim 7 in which at least some of the grooves have portions which extend at an angle to the direction of movement of the tool.

9. In a carpet seaming tool for use with a cloth tape having a longitudinal deposit of hot-melt adhesive thereon comprising, in combination, a generally rectangular sole plate having a heating element, said sole plate having a convergent entryway at the leading end and an extrusion opening at the trailing end, said entryway and extrusion opening being interconnected by a plurality of shallow grooves formed in the surface of the sole plate, and a handle overlying the sole plate for applying forward and downward force.

10. A carpet seaming tool for use with a cloth tape having a longitudinal deposit of hot-melt adhesive thereon comprising, in combination, a generally rectangular sole plate, means for heating the sole plate, a handle overlying the sole plate for guiding the tool along the tape, said sole plate being grooved at the leading end to provide an entryway having convergent side walls and having a shallow longitudinally extending groove at the trailing end to define an extrusion opening, the sole plate being further formeed with a plurality of continuous grooves of serpentine configuration so that the hot-melt adhesive coming into the entryway is, following melting by the sole plate, laterally agitated prior to discharge at the extrusion opening.

11. A carpet seaming tool for use with a cloth tape having an upstanding ribbon of hot-melt adhesive deposited thereon comprising, in combination, a generally rectangular sole plate, means for heating the sole plate, an upstanding handle for guiding the tool along the tape, said sole plate having a shallow groove extending the length of the bottom surface of a total width occupying the greater portion of the width of the sole plate, said groove being formed to define land portions which engage the tape and which present abrupt surfaces but which obstructingly encounter the ribbon of adhesive on the tape so that the progress of the tool is limited by the rate of melting of the adhesive as the tool is drawn by the handle along the tape.

12. A carpet seaming tool for use with a cloth tape having an upstanding ribbon of hot-melt adhesive thereon comprising, in combination, a generally rectangular sole plate, means for heating the sole plate substantially above the melting point of the adhesive, an upstanding handle for guiding the tool along the tape, said sole plate having a shallow groove extending the length thereof, the groove having an entryway at the leading end and an extrusion opening at the trailing end, the entryway having a width which exceeds the width of the ribbon of adhesive and having side walls which are convergently arranged so as to obstructingly engage at least the outer edges of the ribbon of adhesive for melting of the same so that the rate of forward movement of the tool is dependent upon the rate of melt thereby to insure that all of the adhesive in the ribbon is in the molten state by the time of its discharge through the extrusion opening at the trailing end of the tool.

13. The combination as claimed in claim 12 in which the sole plate has a portion which projects forwardly overhanging the regions of engagement for preheating the ribbon of adhesive in advance of the actual engagement and melting.

14. A carpet seaming assembly for seaming together the adjacent edges of sections of carpet comprising, in combination, a fabric tape having an upstanding ribbon of hot-melt adhesive deposited thereon which is of constant cross section from point to point along the length of the tape, a sole plate having a longitudinal groove with an entryway at the leading end and an extrusion opening at the trailing end, a handle overlying the sole plate, the entryway having a width which is greater than the width of the adhesive on the tape, heated obstruction surfaces on the sole plate arranged in the groove for obstructingly engaging the ribbon of adhesive as the sole plate is advanced by the handle thereby to limit the forward progress of the sole plate to the rate of melting of adhesive at the obstruction and thereby to insure that all of the adhesive on the tape is coverted to molten form prior to flow of adhesive through the groove for discharge of molten adhesive at a reliably high temperature from the extrusion opening, the extrusion opening having a cross sectional area which is approximately equal to the cross sectional area of the hot-melt adhesive supplied on the tape so that the extrusion opening remains substantially filled with molten adhesive as the sole plate is advanced for depositing of a layer of molten adhesive of uniform thickness.

15. A carpet seaming tool for use with a cloth tape having a longitudinal ribbon of hot melt adhesive centered thereon which comprises, in combination, a generally rectangular sole plate having a longitudinally extending shallow groove which is centered on the sole pate and which spans the major portion of the width thereof, said groove having a convergent entryway having a maximum width which approaches the width of the sole plate and which is smoothly tapered down to the width of the groove, said entryway and groove defining land surfaces which extend substantially all the way out to the lateral edges of the sole plate, the edges of the plate being formed to rise abruptly from the land surfaces and being smoothly rounded inwardly to merge with the top surface of the sole plate, a hollow cap member having a length and width substantially smaller than that of the sole plate and superimposed upon the sole plate to form a central island thereon, a heating element in said sole plate, said hollow cap member being spaced above the sole plate and insulated with respect thereto so as to minimize direct transfer of heat from the sole plate to the cap member, an upwardly extending bracket on the cap member terminating in a longitudinally extending handle which overlies the cap member and sole plate for the purpose of manually applying forward and downward components of force thereon.

16. The combination as claimed in claim 15 in which a thermostat unit is mounted within the cap member and thermally coupled to the sole plate, the thermostat being connected in series with the heating element for maintenance of a predetermined sole plate temperature.

17. The combination as claimed in claim 15 in which the cap member is of inverted cup-shaped cross-section and in which the sole plate is provided with pedestals for supporting the cap member in an elevated position above the sole plate, said pedestals including thermal insulation for inhibiting of direct transfer of heat from the sole plate to the cap member.

References Cited

UNITED STATES PATENTS

| | | | |
|---|---|---|---|
| 2,720,245 | 10/1955 | Reinhard | 156—216 |
| 2,947,346 | 8/1960 | Thompson | 156—545 |
| 3,119,727 | 1/1964 | Kinnear | 156—579 |

BENJAMIN A. BORCHELT, Primary Examiner

R. E. HART, Assistant Examiner

U.S. Cl. X.R.

156—545